No. 844,203. PATENTED FEB. 12, 1907.
M. M. SMITH.
VARIABLE SPEED GEAR.
APPLICATION FILED FEB. 20, 1906.

Witnesses
J. M. Shynkoop
H. A. Totten.

Inventor
Maxwell Maberly Smith
By Knight Bros
Attys

Fig. 3.

No. 844,203. PATENTED FEB. 12, 1907.
M. M. SMITH.
VARIABLE SPEED GEAR.
APPLICATION FILED FEB. 20, 1906.

UNITED STATES PATENT OFFICE.

MAXWELL MABERLY SMITH, OF LONDON, ENGLAND, ASSIGNOR OF ONE-HALF TO ARTHUR HOPE CONSTABLE, OF PENSHURST, ENGLAND.

VARIABLE-SPEED GEAR.

No. 844,203.        Specification of Letters Patent.        Patented Feb. 12, 1907.

Application filed February 20, 1906. Serial No. 302,021.

*To all whom it may concern:*

Be it known that I, MAXWELL MABERLY SMITH, a subject of the King of England, residing at London, in England, have invented certain new and useful Improvements in Variable-Speed Gear, of which the following is a specification.

This invention relates to variable-speed gear, and has for its object to construct a gear which shall be simple, efficient, and compact.

According to this invention the gear, which is of the friction type, comprises three members—namely, a driving member, a driven member, and an intermediate member which coöperates with the other two members to produce the necessary variations in speed. These variations give a range from zero to a maximum, the engine or other source of power running free when the gear is in the zero position, and when the gear is in the maximum position a direct drive is obtained. The gear may be employed in its simple form when no reversing is obtainable, or it may be combined with clutch devices when reverse driving with variations of speed is obtainable.

In the accompanying drawings.

Like letters indicate like parts throughout the drawings.

A disk A is mounted on or forms part of a sleeve A', which also carries a pulley-wheel $A^2$, sprocket-wheel, or other means for transmitting motion from a source of power. The disk A will hereinafter be referred to as the "driving-disk" and with its sleeve and the pulley-wheel is free to rotate on the shaft B, which is the driven shaft.

A series of disk units C are carried in a manner to be hereinafter described by a cage-like structure and disposed around the periphery of the disk A and also another disk D, which is disposed coaxially with the disk A. Each disk C lies in a conical carrier E, within which is a rubber or other washer E', upon which rests a bearing-plate $E^2$, provided with a ball-race. Each disk C is provided with a center pin C', which passes through an orifice in the center of the plate $E^2$ and conical carrier E, a nut on the outside with split pin keeping the disk C in place.

Figure 3:
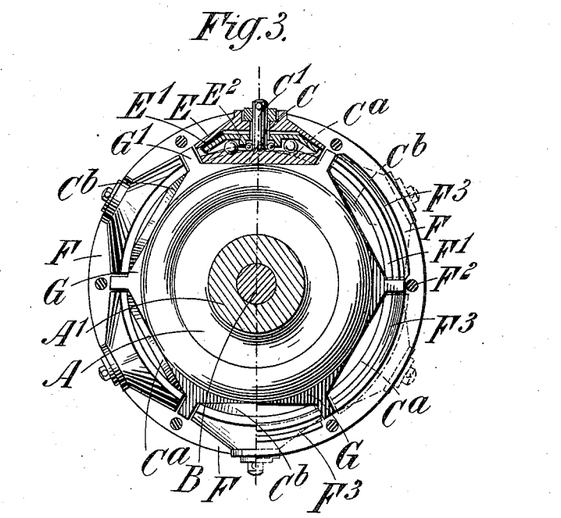
Fig. 3 is a transverse section on the line 3 3 of Fig. 1.

The disks C and carriers E are kept in place by pairs of floating rings F F', each pair being connected by bolts $F^2$. The rings F F' are beveled or cut at an angle internally to correspond with the conical shape of the carriers E. The number of disks C which are employed is either three or a multiple of three. In the illustration six of these disks are used, and they are disposed so that the three disks marked in Fig. 3 $C^a$ are capable of adjustment separately from the three disks marked $C^b$. The object of this is that an effective adjustment is obtainable and there is no chance of slip occurring between the units C and disks A and D, while also the arrangement of the disk units in threes enables the frictional contact to be equally distributed radially and axially. In order to effect the adjustment mentioned, the pair of rings F bear, for example, only against the three carriers E corresponding to the disks $C^a$, the inner periphery of the rings F being cut away, as shown at $F^3$, where they pass over the carriers of the disks $C^b$. Conversely, the rings F' bear only against the carriers of the disks $C^b$, being cut away at $F^3$, where they pass over the carriers of the disks $C^a$. Each pair of rings F or F' has its respective bolts for adjustment purposes and can move either axially or radially independently of the other. The bolts for drawing together the outer rings F' pass freely through holes in the rings F. The bolts for adjusting the rings F are provided with shoulders and sleeves, which lie in enlarged holes or slots in the rings F', so that the latter will not be affected by making adjustment of the rings F. It is of course clear that where, for example, nine disk units are employed three floating adjustment-rings, with their respective bolts, such as F F', must be used, or a larger number, in accordance with the number of disk units.

The disks C and carriers E are of such dimensions and so spaced that between each two there can lie a projection or finger G', carried by a ring G, the ring and projection forming a spider-wheel or toothed disk which is mounted on the shaft B and can be coupled thereto or left free by means of an axially-sliding clutch member $B^2$. The clutch member $B^2$ is connected to a sleeve $B^3$, provided at its outer end with a collar $B^4$. When the spider-wheel G is coupled to the shaft B, it will be seen that any rotary movement of the cage formed by the rings F F' and the bolts $F^2$ will be imparted to the driven shaft B. Such rotary motion is obtained in the manner hereinafter described. The disk D is loosely mounted within the cage F F' $F^2$ and on a cylindrical portion of the clutch member $B^2$. An axially-sliding non-rotatable clutch member H, comprising a sleeve carried upon the sleeve $B^3$, can be moved into engagement with one portion $D^2$ of the disk, so as to lock the latter and prevent it from rotating, this being the normal state when the gear is being used for transmitting motion ahead. It will be seen that in this position of the parts, which is that shown in Fig. 2, the end H' of the clutch member H besides engaging with the clutch portion $D^2$ of the disk D abuts against the clutch $B^2$, and thus serves to keep it in position necessary to engage with the spider-wheel G and couple the latter to the shaft B. If the sleeve H by means of the collar $H^2$ mounted thereon be moved toward the left hand of the drawings, the clutch portion will first be disengaged from $D^2$, leaving the disk D free. Further movement of the sleeve H will cause the end $H^3$ to butt up against the collar $B^4$, thus drawing the clutch $B^2$ out of engagement with the spider G and into engagement with a clutch portion $D^3$ of the disk D. The clutch portion of the sleeve H will now enter into engagement with a clutch member $F^4$, holding it against rotation. The latter is carried by a sleeve which is connected through a feather to a plate $F^5$, forming part of the cage carrying the disks C and coupled to the rings F F' by bolts which pass through this plate. The plate $F^5$, together with the whole cage F F' $F^2$, can slide axially while remaining in engagement with the clutch $F^4$. This axial movement is obtained by means of a groove $F^6$, within which lies a collar J, connected by links J' to a sleeve $J^2$. The latter has an internal screw-thread which engages with a screw-thread on the exterior of a sleeve K, part of which forms a bearing for the shaft B. It will be seen that by giving rotary motion by suitable means to the sleeve K axial movement will be imparted to the cage F F' $F^2$ and disks C.

Figure 1:
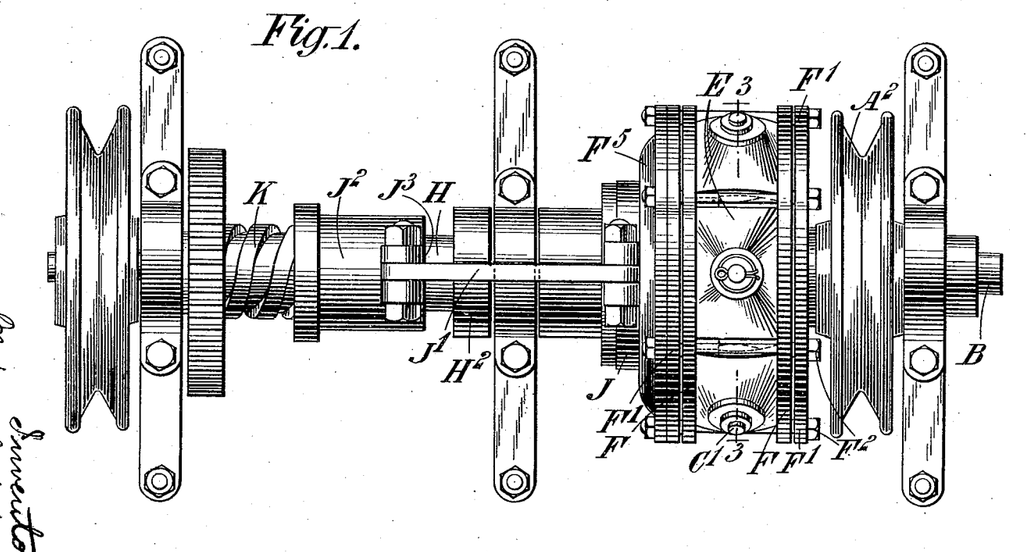
Figure 1 is a side elevation of a gear constructed in accordance with the present invention.
Figure 2:
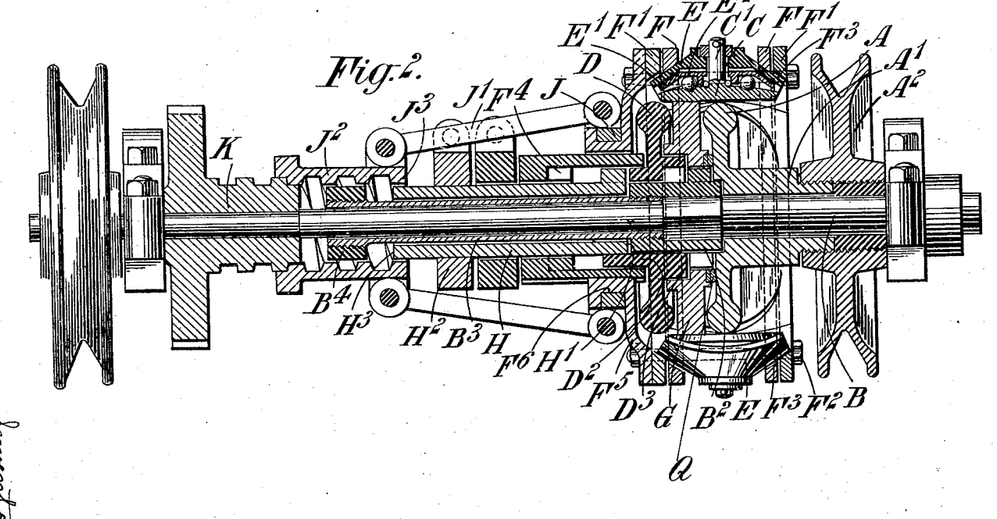
Fig. 2 is a longitudinal vertical section of the same.

The operation of the gear is as follows: As previously mentioned, for driving ahead the spider-wheel G is connected by the clutch $B^2$ to the shaft B, and the disk D is locked by the clutch H, so that it cannot rotate. The disk unit C now being in contact with the peripheries of the disks A and D, the rotation of the former will cause differential movement of the cage F F' $F^2$, and consequently of the spider-wheel G and the driven shaft B. The speed will vary according to the position of the disks C and as the cage carrying them is moved axially. Fig. 2 represents the parts in the position for the highest speed, when, as will be seen, the driving-disk A lies in the axial plane of the disks C, the disk D being out of contact with the disks C. In this case the driving and driven parts are all locked together, and the disks C do not rotate, the disk A, cage F F' $F^2$, spider-wheel G, and shaft B rotating as one. If the cage be now moved to the left of the drawings, the speed decreases until the zero position is reached, when the disk D lies in the axial plane of the disk units C and the disk A is out of contact with the disks C. In this position the driving-disk A rotates freely, while the driven shaft B is locked against rotation through the disk D. In order to effect reverse, the sleeve and clutch H are moved axially to the left, as previously described, so that the spider-wheel G is disconnected from the shaft B; but owing to the engagement of the clutch H with the clutch $F^4$ the cage F F' $F^2$ is locked against rotation. At the same time the disk D is coupled to the driven shaft B. Relative movement of the disks A and D takes place through the rotation of the disks C, and the shaft B is rotated in the reverse direction to that in which the disk A is rotated.

It will be appreciated that when the connections are made for reversing it must not be possible for the disk A to be brought into the axial plane of the disk unit C, and in order to prevent this the distance between the end $J^3$ of the sleeve $J^2$ and the collar $H^2$ is such that these parts will butt up against each other before the cage is moved so far to the right as to bring the disk A into the undesirable position. If by inadvertence or otherwise the sleeve $J^2$ is still further moved, together with the cage, over to the right, the effect is to also move the collar $H^2$ and the clutch-sleeve H, thereby disengaging the clutch $F^4$ and leaving the sage free to rotate without being coupled either to the fixed clutch H or to the driven shaft B, the latter coupling being, as previously described, completed by further movement to the right of the collar $H^2$ and clutch member H.

Figure 4:
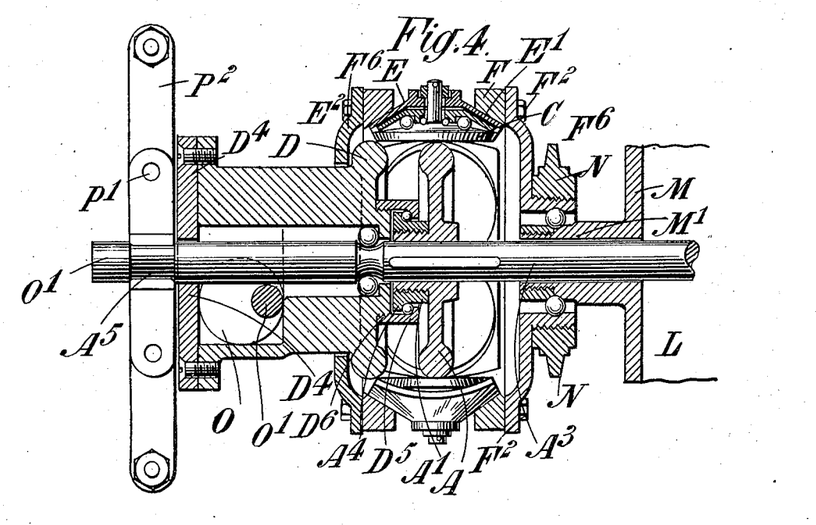
Fig. 4 is a longitudinal section of a simple construction of the gear intended for transmitting motion in one direction only.
Figure 5:
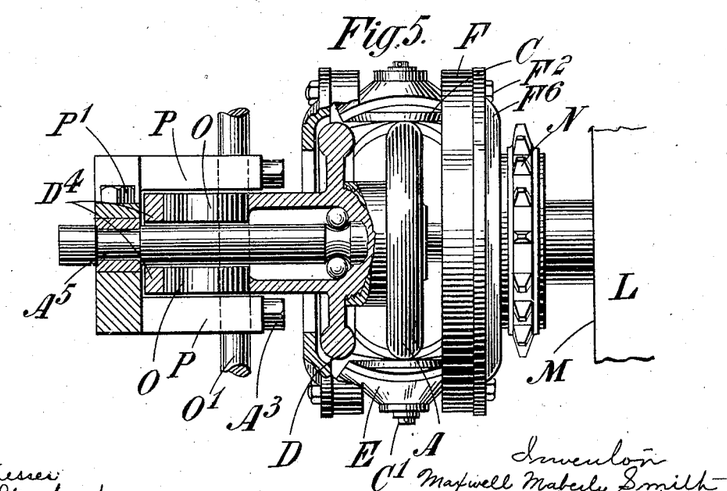
Fig. 5 is a part section of the construction shown in Fig. 4 on an axial plane at right angles to that figure.

The construction illustrated in Fig. 4 is more particularly intended as a specially simple and compact arrangement suitable for a motor-cycle or similar vehicle where a reverse is not required. The disk A, with its sleeve A', is mounted on the shaft $A^3$ of the engine, which is not indicated in the drawings, but is situated at L within the casing M. The sleeve A' is keyed to the shaft $A^3$, so that it can be moved axially thereon, but must rotate therewith. The cage carrying the disk units C is, broadly speaking, constructed as previously described, except that in this instance single rings F, connected and tightened by bolts F², are shown instead of the pairs of rings F F'. Further, two end plates F⁶ are used, one of which, as shown at the right-hand side, carries mounted on an extension thereof the sprocket-wheel N, from which the cycle is driven. Inside this sprocket-wheel are ball-bearings carried on an extension M' of the engine-casing.

The fixed disk D is combined with a double yoke-piece D⁴, disposed on either side of the shaft A³. The disk D may be moved axially, together with the driving-disk A, by providing the sleeve A' with a collar A⁴, which lies within a recess formed by a flanged sleeve D⁵, carried by a projecting portion D⁶ of the disk D. Between the flange or sleeve D⁵ and the collar A⁴ balls are disposed. Ball-bearings are also arranged within the disk D on the end of the engine-shaft A³. Within the yokes D⁴ are situated cams O, carried on a shaft O', resting in bearings P, formed conveniently in two parts bolted at P' around a reduced part A⁵ of the shaft A³ and fixed, as at P², to the framing. If now the cams O be rotated clockwise as looking at Fig. 4, the disks D and A will be moved to the right until the parts reach the zero position. On rotating the cams O counter-clockwise the disks A and D will move to the left until A lies in the axial plane of the disk C, when the disk, cage, and engine-shaft will all rotate as one and the maximum speed will be obtained and the parts will be in the position shown in Fig. 4.

In practical operation difficulty in this gear is found when it is desired to impart axial movement to the cage when the mechanism is not rotating. As will be appreciated, in order to effect this axial movement the friction between the disk units and the disk members A and D must be overcome, which requires some force. If, however, rotary motion can be imparted to the disk units, the desired movement can be effected with little effort. The chief difficulty arises when the gear is in the zero position—that is to say, the disk D lies in the axial plane of the disk units and the disk A is just clear of the faces of these disk units. Instead of the axial distance between the disks A and D being fixed, if the mechanism be constructed so that the distance between these disks can be slightly varied, as by allowing a certain amount of lash for axial movement to one of these disks, the difficulty can be overcome. The alteration necessary to enable the relative movement of these disks to take place may comprise the insertion of a spring-washer Q between one face of the spider-wheel G and the adjacent face of the disk A. Supposing now that the parts are in the zero position, as above indicated, and it is desired to bring the gear into operation, the disk A will be rotating under the influence of the source of power. On operating the mechanism so as to force the cage toward the right as the parts are represented in the accompanying drawings if the disk D was immovable axially the friction between its periphery and the disk units would have to be overcome; but owing to the presence of the spring-washer Q this disk D, together with the spider-wheel G, will slightly move with the cage and disk units to the right until the edges of the disk units engage with the periphery of the disk A. As soon as this occurs rotation will be imparted to the disk units, and further movement of the cage into a position for a higher gearing can be effected with ease. The same difficulty is not necessarily experienced in moving the parts out of the positions shown in Figs. 2 and 4 of the accompanying drawings, as the rotation which is imparted to the disk A from the source of power enables the cage to be moved to the left, so as to bring the disk A out of the axial plane of the disk units, this movement of the cage being comparatively easy.

What I claim as my invention, and desire to secure by Letters Patent, is—

1. In a variable-speed gear the combination of a disk member operatively connected to a source of power a second disk member arranged coaxially with the first disk member and held against rotation, a driven member, a series comprising more than two rotatable disk units disposed equidistantly around and in contact with the peripheries of the disk members, a floating cage operatively connected to the driven member and carrying the disk units and having means for adjusting their radial distances from the axis of the disk members and means for axially varying the relative positions of the disk units and the disk members substantially as set forth.

2. In a variable-speed gear the combination of a disk member operatively connected to a source of power a second disk member arranged coaxially with the first disk member, a driven shaft, a series comprising more than two rotatable disk units disposed equidistantly around and in contact with the peripheries of the disk members, a floating cage, carrying the disk units and having means for adjusting their radial distances from the axis of the disk members means for axially varying the relative positions of the disk units and the disk members and means for alternatively holding the second disk member against rotation and coupling the cage to the driven shaft or holding the cage against rotation and coupling the second disk member to the driven shaft, substantially as set forth.

3. In a variable-speed gear the combination of a disk member operatively connected to a source of power a second disk member arranged coaxially with the first disk member, a driven shaft, a series comprising more than two rotatable disk units disposed equidistantly around and in contact with the peripheries of the disk members, a floating cage, carrying the disk units and having means for adjusting their radial distances from the axis of the disk members, means for imparting axial movement to the cage and disk units with relation to the disk members and means for alternatively holding the second disk member against rotation and coupling the cage to the driven shaft or holding the cage against rotation and coupling the second disk member to the driven shaft, substantially as set forth.

4. In a variable-speed gear the combination of a disk member operatively connected with a source of power a second disk member of the same diameter as the first disk member arranged coaxially therewith and held against rotation, a driven member, a series comprising more than two rotatable disk units disposed equidistantly around and in contact with the peripheries of the disk members, the diameter of each disk unit being not greater than the diameters of the disk members, a floating cage operatively connected to the driven member and carrying the disk units and having means for adjusting their radial distances from the axis of the disk members and means for axially varying the relative positions of the disk units and the disk members substantially as set forth.

5. In a variable-speed gear the combination of a disk member operatively connected with a source of power a second disk member of the same diameter as the first disk member arranged coaxially therewith, a driven shaft, a series comprising more than two rotatable disk units disposed equidistantly around and in contact with the peripheries of the disk members, the diameter of each disk unit being not greater than the diameters of the disk members, a floating cage, carrying the disk units and having means for adjusting their radial distances from the axis of the disk members means for imparting axial movement to the cage and disk units with relation to the disk members and means for alternatively holding the second disk member against rotation and coupling the cage to the driven shaft or holding the cage against rotation and coupling the second disk member to the driven shaft, substantially as set forth.

6. In a variable-speed gear the combination of a disk member operatively connected with a source of power a second disk member arranged coaxially with the first disk member and held against rotation means for allowing one disk member to have limited axial movement relative to the other disk member, a driven member, a series comprising more than two rotatable disk units disposed equidistantly around and in contact with the peripheries of the disk members, a floating cage operatively connected to the driven member and carrying the disk units and having means for adjusting their radial distances from the axis of the disk members and means for axially varying the relative positions of the disk units and the disk members substantially as set forth.

7. In a variable-speed gear the combination of a disk member operatively connected with a source of power a second disk member arranged coaxially with the first disk member, means for allowing one disk member to have limited axial movement relative to the other disk member, a driven shaft, a series comprising more than two rotatable disk units disposed equidistantly around and in contact with the peripheries of the disk members, a floating cage carrying the disk units and having means for adjusting their radial distances from the axis of the disk members means for axially varying the relative positions of the disk units and the disk members and means for alternatively holding the second disk member against rotation and coupling the cage to the driven shaft or holding the cage against rotation and coupling the second disk member to the driven shaft, substantially as set forth.

8. In a variable-speed gear the combination of a disk member operatively connected with a source of power a second disk member arranged coaxially with the first disk member, a driven shaft, a series comprising more than two rotatable disk units disposed equidistantly around and in contact with the periphery of the disk members, a floating cage carrying the disk units and having means for adjusting their radial distances from the axis of the disk members, means for imparting axial movement to the cage and disk units with relation to the disk members, two clutch members on the second disk member, two clutch members connected to the floating cage, a clutch member rotating with but axially movable upon the driven shaft and adapted to be engaged alternatively with one of the clutch members connected to the cage and one of the clutch members connected to the second disk member, a clutch member held against rotation but axially movable and adapted to engage alternatively with the second clutch member on the second disk member and the second clutch member connected to the cage and means for operating the clutch member on the driven shaft and the non-rotatable clutch member substantially as set forth.

9. In a variable-speed gear the combination of a disk member operatively connected with a source of power a second disk member arranged coaxially with the first disk member and held against rotation, a driven member, a series comprising more than two rotatable disk units disposed equidistantly around and in contact with the peripheries of the disk members, a bearing for the spindle of each disk unit, a carrier for each bearing having a conical outer surface, a floating cage operatively connected to the driven member and adjustably holding the conical carriers and disk units so that their radial distances from the axis of the disk members may be varied and means for axially varying the relative positions of the disk units and the disk members substantially as set forth.

10. In a variable-speed gear the combination of a disk member operatively connected with a source of power a second disk member arranged coaxially with the first disk member, a driven shaft, a series comprising more than two rotatable disk units disposed equidistantly around and in contact with the peripheries of the disk members, a bearing for the spindle of each disk unit, a carrier for each bearing having a conical outer surface, a floating cage operatively connected to the driven shaft and adjustably holding the conical carriers and disk units so that their radial distances from the axis of the disk members may be varied and means for imparting axial movement to the cage and disk units with relation to the disk members and means for alternatively holding the second disk member against rotation and coupling the cage to the driven shaft or holding the cage against rotation and coupling the second disk member to the driven shaft, substantially as set forth.

11. In a variable-speed gear the combination of a disk member operatively connected with a source of power a second disk member arranged coaxially with the first disk member and held against rotation, a driven member, a series comprising more than two rotatable disk units disposed equidistantly around and in contact with the peripheries of the disk members, a bearing for the spindle of each disk unit, a carrier for each bearing having a conical outer surface annular members against which the conical carriers rest means for adjusting the annular members with relation to each other and the conical carriers so that the radial distances of the disk units from the axis of the disk members can be varied the annular members and their means of adjustment forming a floating cage operatively connected to the driven member and means for axially varying the relative positions of the disk units and the disk members substantially as set forth.

12. In a variable-speed gear the combination of a disk member operatively connected with a source of power, a second disk member arranged coaxially with the first disk member, a driven shaft, a series comprising more than two rotatable disk units disposed equidistantly around and in contact with the peripheries of the disk members, a bearing for the spindle of each disk unit a carrier for each bearing having a conical outer surface annular members against which the conical carriers rest means for adjusting the annular members with relation to each other and the conical carriers so that the radial distances of the disk units from the axis of the disk members can be varied the annular members and their means of adjustment forming a floating cage operatively connected to the driven shaft, means for imparting axial movement to the cage and disk units with relation to the disk members and means for alternatively holding the second disk member against rotation and coupling the cage to the driven shaft or holding the cage against rotation and coupling the second disk member to the driven shaft, substantially as set forth.

13. In a variable-speed gear the combination of a disk member operatively connected with a source of power a second disk member arranged coaxially with the first disk member, means for allowing one disk member to have limited axial movement relative to the other disk member, a driven shaft, a series comprising more than two rotatable disk units disposed equidistantly around and in contact with the periphery of the disk members, a floating cage carrying the disk units and having means for adjusting their radial distances from the axis of the disk members means for imparting axial movement to the cage and disk units with relation to the disk members, two clutch members on the second disk member, two clutch members connected to the floating cage, a clutch member rotating with but axially movable upon the driven shaft and adapted to be engaged alternatively with one of the clutch members connected to the cage and one of the clutch members connected to the second disk member, a clutch member held against rotation but axially movable and adapted to engage alternatively with the second clutch member on the second disk member and the second clutch member connected to the cage and means for operating the clutch member on the driven shaft and the non-rotatable clutch member substantially as set forth.

14. In a variable-speed gear the combination of a disk member operatively connected with a source of power a second disk member of the same diameter as the first disk member arranged coaxially therewith and held against rotation, a driven member, a series comprising more than two rotatable disk units disposed equidistantly around and in contact with the peripheries of the disk members, the diameter of each disk unit being not greater than the diameters of the disk members, a bearing for the spindle of each disk unit a carrier for each bearing having a conical outer surface a floating cage operatively connected to the driven member and adjustably holding the conical carriers and disk units so that their radial distances from the axis of the disk members may be varied and means for axially varying the relative positions of the disk units and the disk members substantially as set forth.

15. In a variable-speed gear the combination of a disk member operatively connected with a source of power a second disk member of the same diameter as the first disk member arranged coaxially therewith and held against rotation, a driven member, a series comprising more than two rotatable disk units disposed equidistantly around and in contact with the peripheries of the disk members, the diameter of each disk unit being not greater than the diameters of the disk members, a bearing for the spindle of each disk unit a carrier for each bearing having a conical outer surface, annular members against which the conical carriers rest means for adjusting the annular members with relation to each other and the conical carriers so that the radial distances of the disk units from the axis of the disk members can be varied the annular members and their means of adjustment forming a floating cage operatively connected to the driven member and means for axially varying the relative positions of the disk units and the disk members substantially as set forth.

16. In a variable-speed gear the combination of a disk member operatively connected with a source of power a second disk member of the same diameter as the first disk member and arranged coaxially therewith, a driven shaft, a series comprising more than two rotatable disk units disposed equidistantly around and in contact with the peripheries of the disk members, the diameter of each disk unit being not greater than the diameters of the disk members, a bearing for the spindle of each disk unit, a carrier for each bearing having a conical outer surface a floating cage operatively connected to the driven shaft and adjustably holding the conical carriers and disk units so that their radial distances from the axis of the disk members may be varied means for imparting axial movement to the cage and disk units with relation to the disk members and means for alternatively holding the second disk member against rotation and coupling the cage to the driven shaft or holding the cage against rotation and coupling the second disk member to the driven shaft, substantially as set forth.

17. In a variable-speed gear the combination of a disk member operatively connected with a source of power a second disk member of the same diameter as the first disk member and arranged coaxially therewith, a driven shaft, a series comprising more than two rotatable disk units disposed equidistantly around and in contact with the peripheries of the disk members, the diameter of each disk unit being not greater than the diameters of the disk members, a bearing for the spindle of each disk unit a carrier for each bearing having a conical outer surface annular members against which the conical carriers rest means for adjusting the annular members with relation to each other and the conical carriers so that the radial distances of the disk units from the axis of the disk members can be varied the annular members and their means of adjustment forming a floating cage operatively connected to the driven shaft means for imparting axial movement to the cage and disk units with relation to the disk members and means for alternatively holding the second disk member against rotation and coupling the cage to the driven shaft or holding the cage against rotation and coupling the second disk member to the driven shaft, substantially as set forth.

18. In a variable-speed gear the combination of a disk member operatively connected with a source of power a second disk member arranged coaxially with the first disk member, a driven shaft, a series comprising more than two rotatable disk units disposed equidistantly around and in contact with the peripheries of the disk members, a bearing for the spindle of each disk unit, a carrier for each bearing having a conical outer surface annular members against which the conical carriers rest means for adjusting the annular members with relation to each other and the conical carriers so that the radial distances of the disk units from the axis of the disk members can be varied the annular members and their means of adjustment forming a floating cage means for imparting axial movement to the cage and disk units with relation to the disk members, two clutch members on the second disk member two clutch members connected to the floating cage, a clutch member rotating with but axially movable upon the driven shaft and adapted to be engaged alternatively with one of the clutch members connected to the cage and one of the clutch members connected to the second disk member, a clutch member held against rotation but axially movable and adapted to engage alternatively with the second clutch member on the second disk member and the second clutch member connected to the cage and means for operating the clutch member on the driven shaft and the non-rotatable clutch member substantially as set forth.

19. In a variable-speed gear the combination of a disk member operatively connected with a source of power a second disk member arranged coaxially with the first disk member, means for allowing one disk member to have limited axial movement relative to the other disk member, a driven shaft a series comprising more than two rotatable disk units disposed equidistantly around and in contact with the peripheries of the disk members a bearing for the spindle of each disk unit a carrier for each bearing having a conical outer surface annular members against which the conical carriers rest, means for adjusting the annular members with relation to each other and the conical carriers so that the radial distances of the disk units from the axis of the disk members can be varied the annular members and their means of adjustment forming a floating cage, means for imparting axial movement to the cage and disk units with relation to the disk members, two clutch members on the second disk member two clutch members connected to the floating cage a clutch member rotating with but axially movable upon the driven shaft and adapted to be engaged alternatively with one of the clutch members connected to the cage and one of the clutch members connected to the second disk member, a clutch member held against rotation but axially movable and adapted to engage alternatively with the second clutch member on the second disk member and the second clutch member connected to the cage and means for operating the clutch member on the driven shaft and the non-rotatable clutch member substantially as set forth.

20. In a variable-speed gear the combination of a disk member operatively connected with a source of power a second disk member arranged coaxially with the first disk member and held against rotation, a driven member, a series comprising more than two rotatable disk units disposed equidistantly around and in contact with the peripheries of the disk members, a bearing for the spindle of each disk unit, a carrier for each bearing having a conical outer surface, annular members against which the conical carriers rest, means for adjusting the annular members with relation to each other and the conical carriers so that the radial distances of the disk units from the axis of the disk members can be varied the annular members and their means of adjustmtent forming a floating cage, a rotatable member operatively connected to the driven member and having peripheral projections in such engagement with the floating cage and carriers for the disk units as to allow the cage and disk units to have axial movement relative to this rotatable member and means for imparting axial movement to the cage and disk units, substantially as set forth.

21. In a variable-speed gear the combination of a disk member operatively connected with a source of power a second disk member arranged coaxially with the first disk member, a driven shaft, a series comprising more than two rotatable disk units disposed equidistantly around and in contact with the peripheries of the disk members, a bearing for the spindle of each disk unit a carrier for each bearing having a conical outer surface annular members against which the conical carriers rest means for adjusting the annular members with relation to each other and the conical carriers so that the radial distances of the disk units from the axis of the disk members can be varied the annular members and their means of adjustment forming a floating cage, a rotatable member operatively connected to the driven shaft and having peripheral projections in such engagement with the floating cage and carriers for the disk units as to allow the cage and disk units to have axial movement relative to this rotatable member and means for imparting axial movement to the cage and disk units and means for alternatively holding the second disk member against rotation and coupling the cage to the driven shaft or holding the cage against rotation and coupling the second disk member to the driven shaft, substantially as set forth.

22. In a variable-speed gear the combination of a disk member operatively connected with a source of power a second disk member arranged coaxially with the first disk member, a driven shaft, a series, comprising more than two rotatable disk units disposed equidistantly around and in contact with the peripheries of the disk members, a bearing for the spindle of each disk unit a carrier for each bearing having a conical outer surface annular members against which the conical carriers rest means for adjusting the annular members with relation to each other and the conical carriers so that the radial distances of the disk units from the axis of the disk members can be varied the annular members and their means of adjustment forming a floating cage, a rotatable member having peripheral projections in such engagement with the floating cage and carriers for the disk units as to allow the cage and disk units to have axial movement relative to this rotatable member and means for imparting axial movement to the cage and disk units, two clutch members on the second disk member two clutch members connected to the floating cage one of which is carried by the rotatable member a clutch member rotating with but axially movable upon the driven shaft and adapted to be engaged alternatively with the clutch member carried by the rotatable member of the cage and one of the clutch members connected to the second disk member a clutch member held against rotation but axially movable and adapted to engage alternatively with the second clutch member on the second disk member and the second clutch member connected to the cage and means for operating the clutch member on the driven shaft and the rotatable clutch member substantially as set forth.

23. In a variable-speed gear the combination of a disk member operatively connected to a source of power a second disk member arranged coaxially with the first disk member and held against rotation, a driven member, a series of rotatable disk units arranged in groups of three each member in each group being equidistant from the other members in the same group and all the disk units being equidistantly disposed around and in contact with the peripheries of the disk members, a floating cage operatively connected to the driven member and carrying the disk units and having means for adjusting the radial distances from the axis of the disk members of each group of three disk units and means for axially varying the relative positions of the disk units and the disk members substantially as set forth.

24. In a variable-speed gear the combination of a disk member operatively connected to a source of power a second disk member arranged coaxially with the first disk member, a driven shaft, a series of rotatable disk units arranged in groups of three each member in each group being equidistant from the other members in the same group and all the disk units being equidistantly disposed around and in contact with the peripheries of the disk members a floating cage operatively connected to the driven shaft and carrying the disk units and having means for adjusting the radial distances from the axis of the disk members of each group of three disk units and means for axially varying the relative positions of the disk units and disk members, means for alternatively holding the second disk member against rotation and coupling the cage to the driven shaft or holding the cage against rotation and coupling the second disk member to the driven shaft, substantially as set forth.

25. In a variable-speed gear the combination of a disk member operatively connected to a source of power a second disk member arranged coaxially with the first disk member and held against rotation, a driven member a series of rotatable disk units arranged in groups of three each member in each group being equidistant from the other members in the same group and all the disk units being equidistantly disposed around and in contact with the peripheries of the disk members, a bearing for the spindle of each disk unit a carrier for each bearing having a conical outer surface annular members against which the conical carriers rest means for adjusting the annular members with relation to each other and the conical carriers so that the radial distances from the axis of the disk members of each group of three disk units can be varied, the annular members and their means of adjustment forming a floating cage operatively connected to the driven member and means for axially varying the relative positions of the disk units and the disk members substantially as set forth.

26. In a variable-speed gear the combination of a disk member operatively connected to a source of power a second disk member arranged coaxially with the first disk member, a driven shaft a series of rotatable disk units arranged in groups of three each member in each group being equidistant from the other members in the same group and all the disk units being equidistantly disposed around and in contact with the peripheries of the disk members, a bearing for the spindle of each disk unit a carrier for each bearing having a conical outer surface annular members against which the conical carriers rest means for adjusting the annular members with relation to each other and the conical carriers so that the radial distances from the axis of the disk members of each group of three disk units can be varied, the annular members and their means of adjustment forming a floating cage, means for imparting axial movement to the cage and disk units with relation to the disk members and means for alternatively holding the second disk member against rotation and coupling the cage to the driven shaft or holding the cage against rotation and coupling the second disk member to the driven shaft, substantially as set forth.

27. In a variable-speed gear the combination of a disk member operatively connected to a source of power a second disk member arranged coaxially with the first disk member, a driven shaft, a series of rotatable disk units arranged in groups of three each member in each group being equidistant from the other members in the same group and all the disk units being equidistantly disposed around and in contact with the peripheries of the disk members, a floating cage operatively connected to the driven shaft and carrying the disk units and having means for adjusting the radial distances from the axis of the disk members of each group of three disk units, means for imparting axial movement to the cage and disk units with relation to the disk members, two clutch members on the second disk member two clutch members connected to the floating cage a clutch member rotating with but axially movable upon the driven shaft and adapted to be engaged alternatively with one of the clutch members connected to the cage and one of the clutch members connected to the second disk member, a clutch member held against rotation but axially movable and adapted to engage alternatively with the second clutch member on the second disk member and the second clutch member connected to the cage and means for operating the clutch member on the driven shaft and the non-rotatable clutch member substantially as set forth.

28. In a variable-speed gear the combination of a disk member operatively connected to a source of power a second disk member arranged coaxially with the first disk member means for allowing one disk member to have limited axial movement relative to the other disk member a driven shaft a series of rotatable disk units arranged in groups of three each member in each group being equidistant from the other members in the same group and all the disk units being equidistantly disposed around and in contact with the peripheries of the disk members a bearing for the spindle of each disk unit a carrier for each bearing having a conical outer surface annular members against which the conical carriers rest means for adjusting each pair of annular members with relation to each other and the conical carriers of a group of disk units so that the radial distances from the axis of the disk members of each group of three disk units can be varied, the annular members and their means of adjustment forming a floating cage, means for imparting axial movement to the cage and disk units with relation to the disk members, two clutch members on the second disk member two clutch members connected to the floating cage a clutch member rotating with but axially movable upon the driven shaft and adapted to be engaged alternatively with one of the clutch members connected to the cage and one of the clutch members connected to the second disk member, a clutch member held against rotation but axially movable and adapted to engage alternatively with the second clutch member on the second disk member and the second clutch member connected to the cage and means for operating the clutch member on the driven shaft and the non-rotatable clutch member substantially as set forth.

29. In a variable-speed gear the combination of a disk member operatively connected with a source of power a second disk member arranged coaxially with the first disk member a driven member, a series of rotatable disk units arranged in groups of three each member in each group being equidistant from the other members in the same group and all the disk units being equidistantly disposed around and in contact with the peripheries of the disk members a bearing for the spindle of each disk unit a carrier for each bearing having a conical outer surface annular members against which the conical carriers rest means for adjusting each pair of annular members with relation to each other and the conical carriers of a group of disk units so that the radial distances from the axis of the disk members of each group of three disk units can be varied the annular members and their means of adjustment forming a floating cage, a rotatable member operatively connected to the driven member and having peripheral projections in such engagement with the floating cage and carriers for the disk units as to allow the cage and disk units to have axial movement relative to this rotatable member means for imparting axial movement to the cage and means for alternatively holding the second disk member against rotation and coupling the cage to the driven member or holding the cage against rotation and coupling the second disk member to the driven member substantially as set forth.

30. In a variable-speed gear the combination with a disk member operatively connected with the source of power a second member arranged coaxially with the first disk member a driven shaft a series of rotatable disk units arranged in groups of three each member in each group being equidistant from the other members in the same group and all the disk units being equidistantly disposed around and in contact with the peripheries of the disk members a bearing for the spindle of each disk unit a carrier for each bearing having a conical outer surface annular members against which the conical carriers rest, means for adjusting each pair of annular members with relation to each other and the conical carriers of each group of disk units so that the radial distances from the axis of the disk members of each group of three disk units can be varied the annular members and their means of adjustment forming a floating cage, a rotatable member having peripheral projections in such engagement with the floating cage and carriers for the disk units as to allow the cage and disk units to have axial movement relative to this rotatable member and means for imparting axial movement to the cage and disk units, two clutch members on the second disk member two clutch members connected to the floating cage one of which is carried by the rotatable member a clutch member rotating with but axially movable upon the driven shaft and adapted to be engaged alternatively with the clutch member carried by the rotatable member of the cage and one of the clutch members connected to the second disk member a clutch member held against rotation but axially movable and adapted to engage alternatively with the second clutch member on the second disk member and the second clutch member connected to the cage and means for operating the clutch member on the driven shaft and the rotatable clutch member substantially as set forth.

31. In a variable-speed gear the combination of a disk member operatively connected to a source of power a second disk member arranged coaxially with the first disk member and held against rotation, a driven member a series of rotatable disk units arranged in groups of three each member in each group being equidistant from the other members in the same group and all the disk units being equidistantly disposed around and in contact with the peripheries of the disk members, a bearing for the spindle of each disk unit a carrier for each bearing having a conical outer surface, annular members arranged in pairs each pair lying in contact with and supporting the conical carriers of a group of disk units means for drawing each pair of annular members together and so adjusting the conical carriers of the group of disk units that they support that the radial distances from the axis of the disk members of this group of disk units can be varied, the annular members and their means of adjustment forming a floating cage operatively connected to the driven member and means for imparting axial movement to the cage and disk units with relation to the disk members substantially as set forth.

32. In a variable-speed gear the combination of a disk member operatively connected to a source of power a second disk member arranged coaxially with the first disk member, a driven shaft a series of rotatable disk units arranged in groups of three each member in each group being equidistant from the other members in the same group and all the disk units being equidistantly disposed around and in contact with the peripheries of the disk members, a bearing for the spindle of each disk unit a carrier for each bearing having a conical outer surface annular members arranged in pairs each pair lying in contact with and supporting the conical carriers of a group of disk units means for drawing each pair of annular members together and so adjusting the conical carriers of the group of disk units that they support that the radial distances from the axis of the disk members of this group of disk units can be varied, the annular members and their means of adjustment forming a floating cage, means for imparting axial movement to the cage and disk units with relation to the disk members and means for alternatively holding the second disk member against rotation and coupling the cage to the driven shaft for holding the cage against rotation and coupling the second disk member to the driven shaft substantially as set forth.

33. In a variable-speed gear, the combination of a disk member operatively connected to a source of power, a second disk member arranged coaxially with the first disk member and held against rotation, a series comprising more than two rotatable disk units disposed equidistantly around and in contact with the peripheries of the disk members, a floating cage operatively connected to the disk members, and carrying the disk units and having means for adjusting the radial distances of said disk units from the axis of the disk members, and means for axially varying the relative positions of the disk units and the disk members, substantially as set forth.

In testimony whereof I have signed my name to this specification in the presence of two subscribing witnesses.

MAXWELL MABERLY SMITH.

Witnesses:
B. E. DUNBAR KILBURN,
MAURICE STROPE.